US012400435B2

(12) United States Patent
Chang

(10) Patent No.: US 12,400,435 B2
(45) Date of Patent: Aug. 26, 2025

(54) IMAGE SELECTION METHOD APPLIED TO MODEL RETRAINING

(71) Applicant: PEGATRON CORPORATION, Taipei (TW)

(72) Inventor: Kai-Chun Chang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 350 days.

(21) Appl. No.: 18/318,448

(22) Filed: May 16, 2023

(65) Prior Publication Data
US 2024/0046623 A1 Feb. 8, 2024

(30) Foreign Application Priority Data
Aug. 3, 2022 (TW) .................................. 111129181

(51) Int. Cl.
G06V 10/776 (2022.01)
G06V 10/778 (2022.01)
G06V 10/82 (2022.01)
G06V 20/50 (2022.01)
G06V 20/70 (2022.01)
G06V 10/74 (2022.01)
G06V 10/77 (2022.01)

(52) U.S. Cl.
CPC .......... *G06V 10/776* (2022.01); *G06V 10/778* (2022.01); *G06V 10/82* (2022.01); *G06V 20/50* (2022.01); *G06V 20/70* (2022.01); *G06V 10/761* (2022.01); *G06V 10/7715* (2022.01)

(58) Field of Classification Search
CPC .... G06V 10/776; G06V 10/778; G06V 10/82; G06V 20/50; G06V 20/70; G06V 10/761; G06V 10/7715; G06V 10/774; G06V 10/98; G06V 10/764
See application file for complete search history.

(56) References Cited

U.S. PATENT DOCUMENTS

| 2019/0042940 | A1 | 2/2019 | Sakairi et al. |
| 2020/0167885 | A1* | 5/2020 | Kimura ................... G06T 7/001 |
| 2020/0205325 | A1* | 6/2020 | Jonasson ............ H05K 13/0812 |
| 2022/0067434 | A1 | 3/2022 | Nakagawa |
| 2023/0391357 | A1* | 12/2023 | Yang ....................... G06F 16/58 |
| 2024/0168589 | A1* | 5/2024 | Javaheri ................. G06N 20/00 |
| 2024/0368980 | A1* | 11/2024 | Alrumaih ............. G06V 10/764 |

FOREIGN PATENT DOCUMENTS

| TW | 202207240 A | 2/2022 |
| TW | M622854 U | 2/2022 |

* cited by examiner

Primary Examiner — Ming Y Hon
(74) Attorney, Agent, or Firm — Muncy, Geissler, Olds & Lowe, P.C.

(57) ABSTRACT

An image selection method is applied to retrain a model. The model is suitable for determining the component types of multiple component images, and each component type corresponds to at least one installation site. The image selection method at least includes the following steps: establishing an image labeling library, which includes a plurality of component images, and each component image is correspondingly labeled with a component type and an installation site; creating an error record, which includes at least one wrong component type previously determined incorrectly by the model and at least one wrong installation site corresponding to the wrong component type; and executing an image selection assignment to create a data set.

12 Claims, 4 Drawing Sheets

IMAGE SELECTION METHOD APPLIED TO MODEL RETRAINING

CROSS REFERENCE TO RELATED APPLICATIONS

This Non-provisional application claims priority under 35 U.S.C. § 119(a) on Patent Application No(s). 111129181 filed in Taiwan, Republic of China on Aug. 3, 2022, the entire contents of which are hereby incorporated by reference.

BACKGROUND

Technology Field

The present disclosure relates to a selection method and, in particular, to an image selection method applied to model retraining.

Description of Related Art

Conventionally, when applying a new artificial intelligence model on the production line, it requires three steps: a data collection step, a model training step, and a model deployment step. The data collection step is to collect component images manually, to label the component images, and to balance the numbers of component images of different types. The model training step is to input the above-mentioned integrated data set to a training system for model training. The greater the number of component images in the data set, the longer the model training time, but the higher the accuracy. The model deployment step deploys the above-mentioned trained model to the production line. If the prediction model of the production line is abnormal, it will cause a loss in production capacity. The longer the re-deployment time, the greater the loss in production capacity and cost.

However, the conventional method involves a lot of manual processing steps in the data collection step, and under the limitation of resource environment, it is usually difficult to correctly realize the number of images in the data set during data collection.

SUMMARY

This disclosure is to provide an image selection method for model retraining, which can efficiently collect data sets for training, thereby shortening the time of manual processing in the data collection step, speeding up the model re-deployment time, and reducing the loss of production capacity.

To achieve the above, an image selection method of this disclosure is applied to retrain a model, wherein the model is suitable for determining component types of a plurality of component images, and each of the component types corresponds to at least one of a plurality of installation sites. The image selection method at least includes the following steps of: establishing an image labeling library, wherein the image labeling library includes the plurality of component images, and each of the component images is correspondingly labeled with one of the component types and one of the installation sites; creating an error record, wherein the error record includes at least one wrong component type previously determined incorrectly by the model and at least one wrong installation site corresponding to the wrong component type; and executing an image selection assignment to create a data set. The image selection assignment includes: obtaining a total number of images used for training the model by performing an operation with an optimization algorithm based on the model and a training system for training the model; based on the total number of images, a total number of the component types and a total number of the installation sites corresponding to the component types, obtaining a plurality of average site image numbers corresponding to the component types; based on a total weight value, a total number of the wrong component type and a total number of the wrong installation site corresponding to the wrong component type, obtaining at least one wrong site weight value corresponding to the wrong installation site; obtaining a plurality of weights corresponding to the installation sites in the wrong component type based on the wrong site weight value, and performing a weight calculation with the weights and the corresponding average site image numbers to obtain a plurality of site image numbers corresponding to the installation sites in the wrong component type respectively; and selecting the component images labeled as the wrong component type and the installation sites in the wrong component type from the image labeling library according to the site image numbers, and adding the selected component images to the data set.

As mentioned above, the image selection method of this disclosure, which is applied to retrain a model, includes the steps of establishing an image labeling library, creating an error record, obtaining a total number of images used for training the model by performing an operation with an optimization algorithm, and automatically executing an image selection assignment of component images corresponding to the component types and installation sites, respectively, according to the error record so as to establish a data set. Based on these steps and contents, the image selection method of this disclosure can efficiently collect the data set used for training the model, thereby shortening the time spent on manual processing and model re-deployment, and reducing the loss of production capacity.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

This disclosure provides an image selection method, which is used for selecting images for retraining a model. In this following embodiment, the model is used to determine component types corresponding to multiple component images, and each component type corresponds to at least one of a plurality of installation sites. In some embodiments, the components can be electronic components, such as for example but not limited to capacitors, USB (Universal Serial Bus), resistors, power supplies, inductors, transistors, or any of other types of electronic components.

This disclosure combines tools such as the big data, the optimization algorithm (e.g. a linear programming algorithm) and the deep learning model. When an abnormal determination of the model occurs, the image selection method can consider the information of the training system for training the model, and select the required image data set for retraining the model in real time, thereby reducing the time of manual selection and labeling data. When the component image is abnormally labeled, the image selection method can correct the label of the component image and feedback it to the data set, so as to correct the component images whose labels have not been checked in the data set in real time, thereby shortening the time for manual processing and redeployment and reducing the loss of production capacity.

Figure 1:
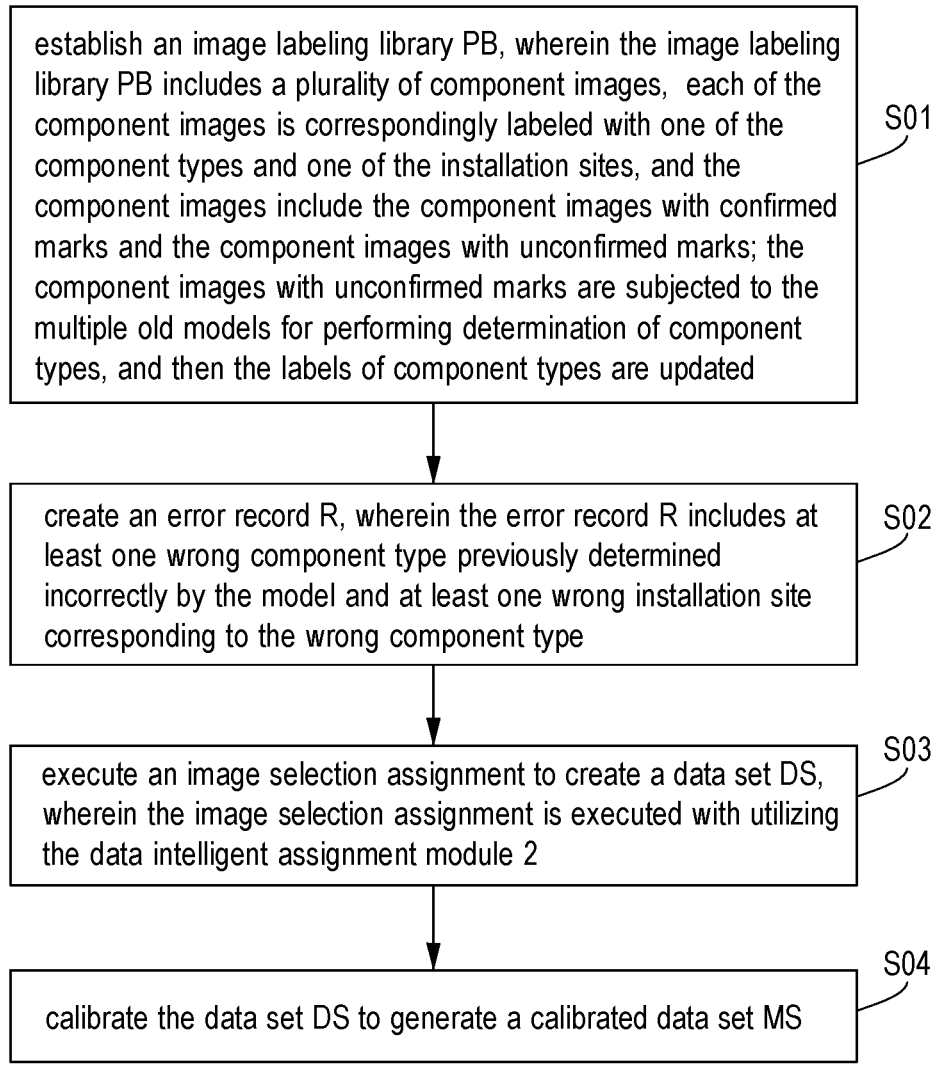
FIG. 1 is a flow chart of an image selection method applied to retrain a model according to an embodiment of this disclosure.
Figure 2:
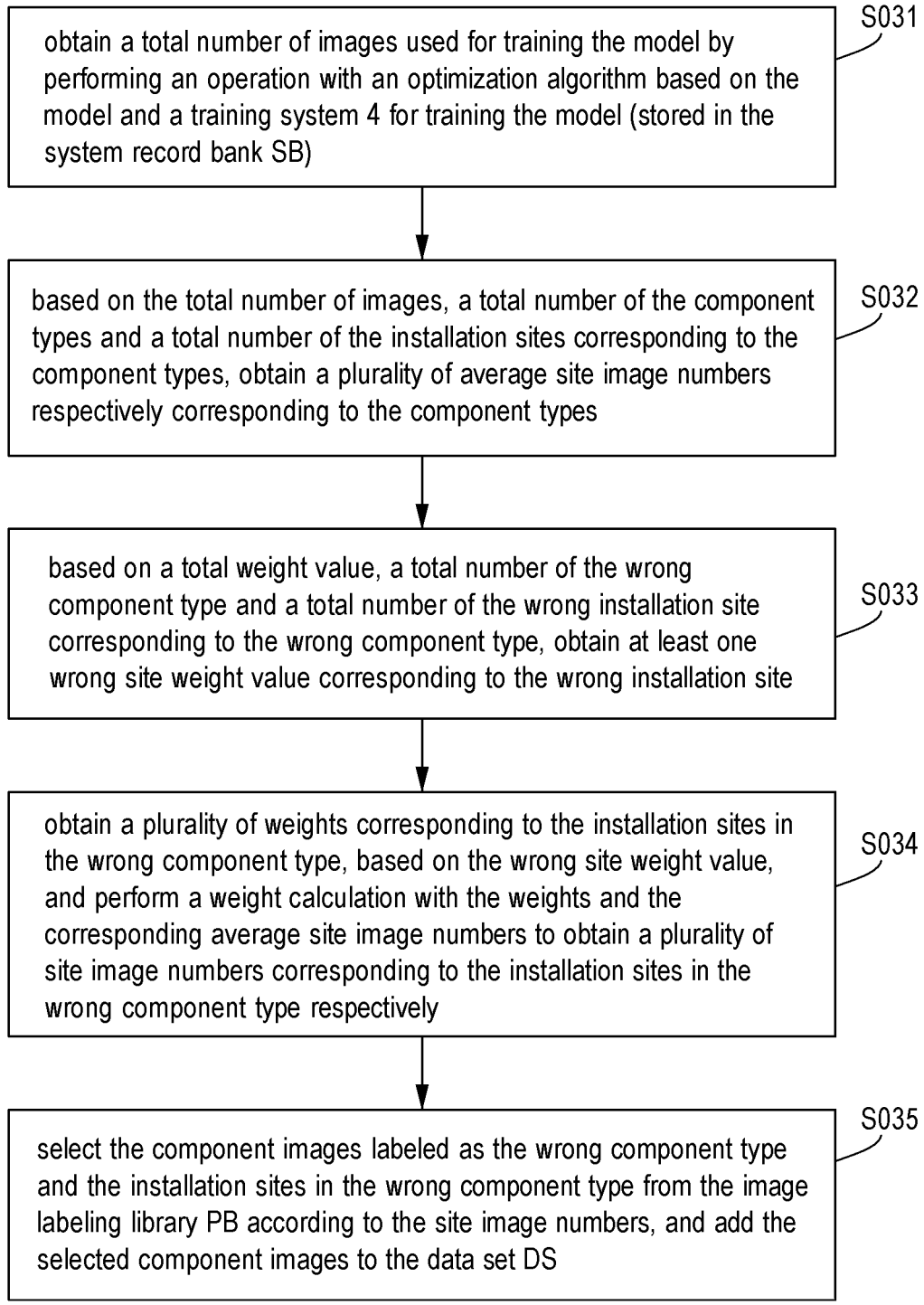
FIG. 2 is a flow chart showing the detailed steps of the image selection assignment of FIG. 1.
Figure 3:
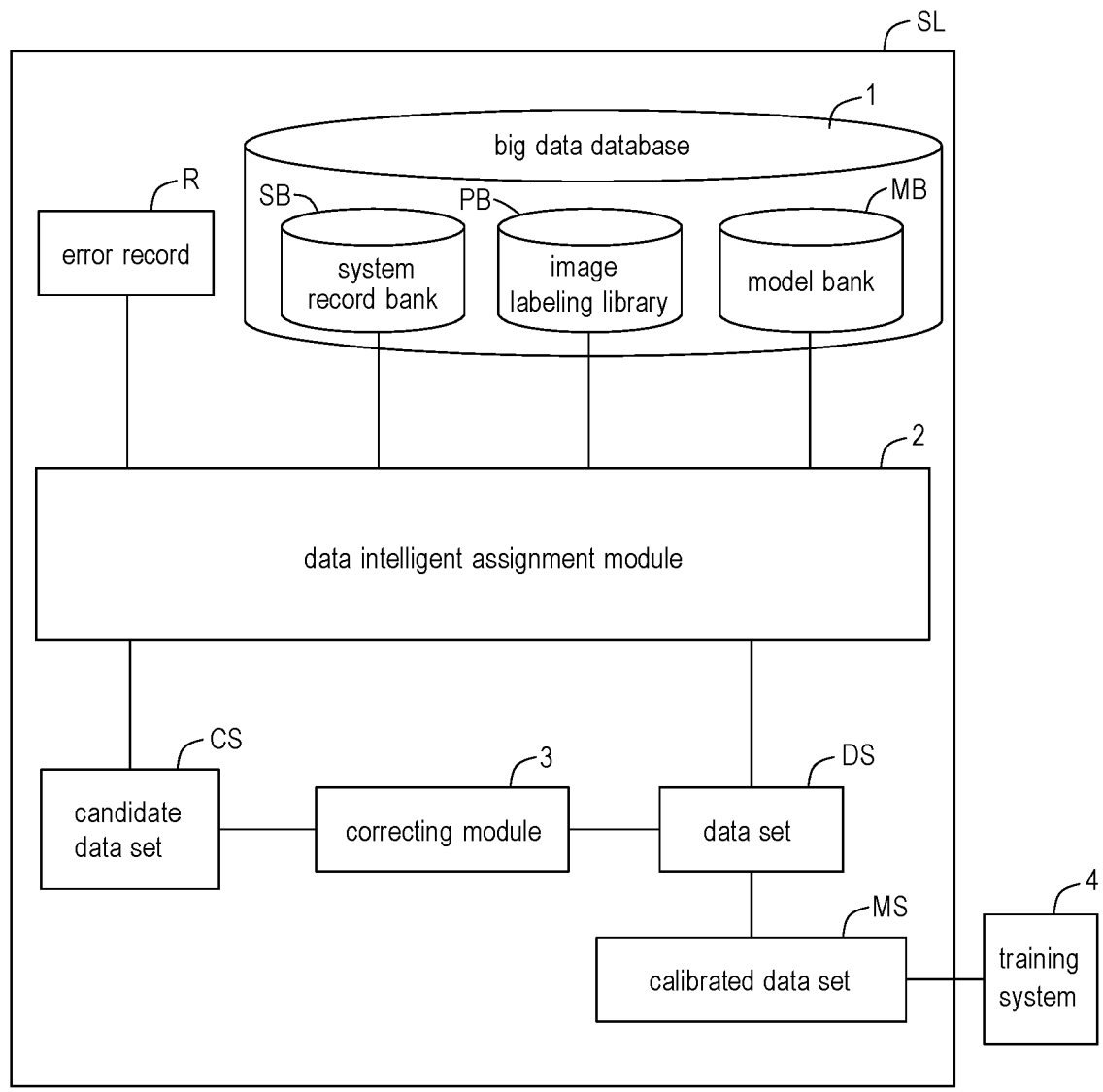
FIG. 3 is a schematic diagram showing an image selection system.
Figure 4:
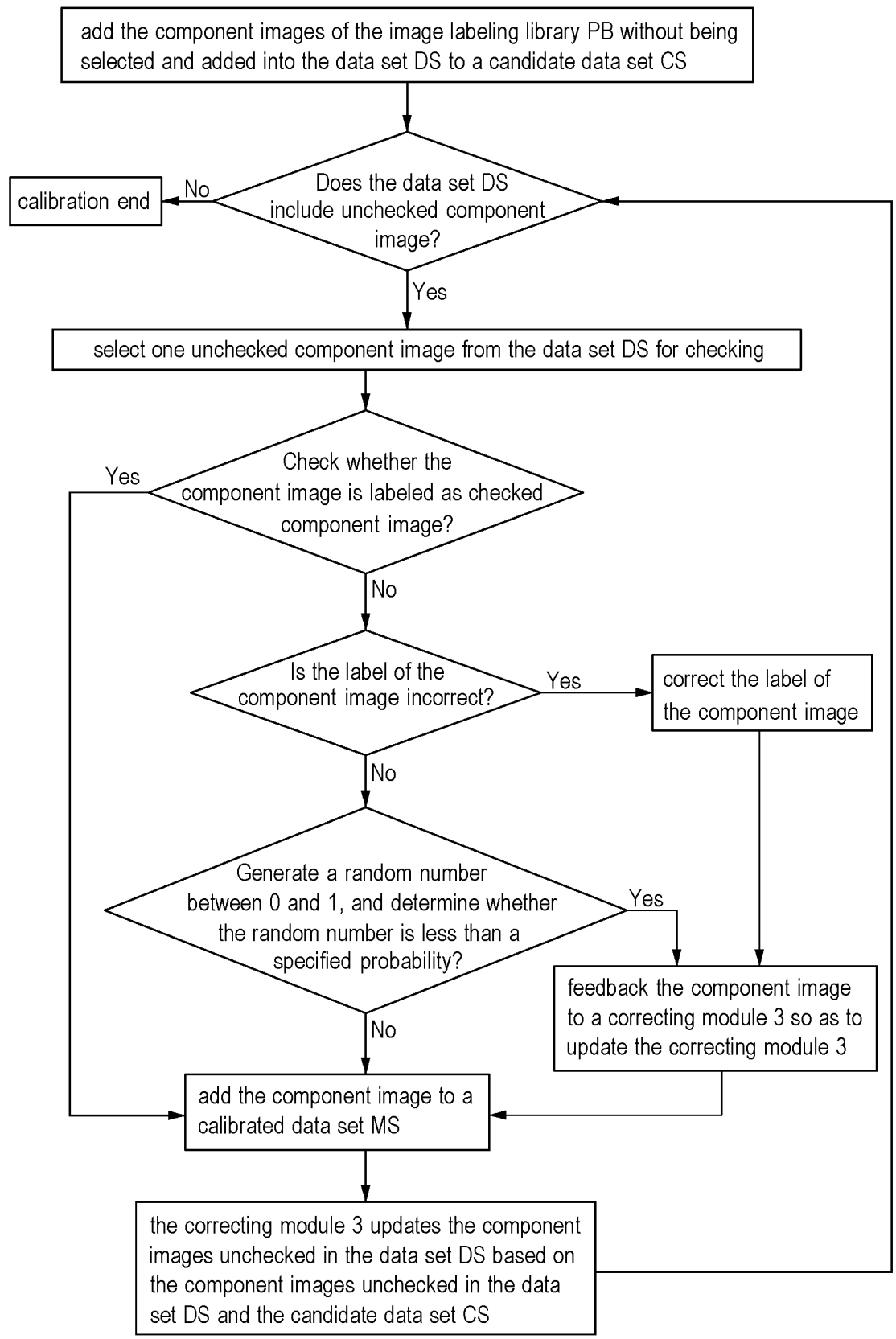
FIG. 4 is a flow chart showing the detail of the step of calibrating the data set.

FIG. 1 is a flow chart of an image selection method applied to retrain a model according to an embodiment of this disclosure, FIG. 2 is a flow chart showing the detailed steps of the image selection assignment of FIG. 1, FIG. 3 is a schematic diagram showing an image selection system, and FIG. 4 is a flow chart showing the detail of the step of calibrating the data set.

Referring to FIGS. 1 to 3, the image selection method applied to retrain a model of this disclosure may at least include steps S01 to S04, and the step S03 can include steps S031 to S035. All the steps described in this embodiment can be executed by an image selection system SL, which can be specifically a computer.

The step S01 is to establish an image labeling library PB, wherein the image labeling library PB includes a plurality of component images, and each of the component images is correspondingly labeled with one of the component types and one of the installation sites (i.e., labeling the name and installation position of the component). The component images include multiple component images with confirmed mark and multiple component images with unconfirmed mark. That is, in the image labeling library PB, some component images are marked as have been checked and confirmed as that the label is correct, and some component image are marked as have not been checked and that the label may be incorrect. As shown in FIG. 3, in addition to the image labeling library PB, the big data database 1 may further include a model bank MB and the system record bank SB. The model bank MB may contain multiple old models that are previously trained. Specifically, the old model is an old version of the model generated by the previously model training. Therefore, the old model can also be used to determine the component types corresponding to the component images. The system record bank SB records the configuration information of a training system 4, such as the specifications of CPU, GPU, memory and etc. of the training system 4. Here, the training system 4 is a system for training a model by using component images, and it can be specifically a computer.

The source of the component images of the image labeling library PB can include the data set used in the previous model training (the component images used in the previous model training and the labeled information of the component images, which can be called as old data), and an inference data set generated by using the model to determine the component types of the component images and label them (which can be called as new data). In this case, the component images from the old data are all component images with confirmed marks, while the component images from the new data include the component images with confirmed marks and the component images with unconfirmed marks. Specifically, all the component images in the old data and some of the component images in the new data have been checked in the past and confirmed that the labels thereof are correct, and there is no need to correct the labels, which means that these component images belong to the component images with confirmed marks. Nevertheless, the others of the component images in the new data has been determined by the model to determine the component types and to be labeled, the correctness of the labels is doubtable because the component images have not been checked and the model has issued an abnormal determination warning. Therefore, these component images may need to be corrected again and are belong to the component images with unconfirmed marks.

In some embodiments, the step S01 of establishing the image labeling library PB can further include: retrieving multiple old models from the model bank MB, and using the multiple old models to deduce and correct the labeling information of "the component images with unconfirmed marks", thereby utilizing the concept of ensemble learning to improve the reliability of the labels. In this case, the component images with unconfirmed marks are subjected to the multiple old models (e.g. the three old models trained most recently) for performing determination of component types, and then the labels of component types of the component images with unconfirmed marks are updated according to the average results of the determinations of these old models.

Please refer to Table 1. The average result of the determinations of the old models refers to using the old models to determine the probabilities of the component image corresponding to each of component types, taking the average of the probabilities determined by the old models, and then determining that the component type of the component image is the component type with the highest corresponding probability. For example, in Table 1, the old model T1 determines that the probability that a component image corresponds to component type A is 0.55, the old model T2 determines that the probability that the component image corresponds to component type A is 0.42, and the old model T3 determines the probability that the component image corresponds to component type A is 0.37. After taking the average of the probabilities determined by the old models, the probability that the component image corresponds to component type A is (0.55+0.42+0.37)/3=0.45. Similarly, after taking the average, the probabilities of the component image corresponding to component types B and C are 0.35 and 0.20 respectively. Finally, it is determined that the component image corresponds to component type A (the highest probability, 0.45).

TABLE 1 example of the average result determined by multiple old models

| | Probability that the component image corresponds to component type A | Probability that the component image corresponds to component type B | Probability that the component image corresponds to component type C |
|---|---|---|---|
| Result of old model T1 | 0.55 | 0.32 | 0.13 |
| Result of old | 0.42 | 0.32 | 0.26 |

TABLE1-continued example of the average result determined by multiple old models

| | Probability that the component image corresponds to component type A | Probability that the component image corresponds to component type B | Probability that the component image corresponds to component type C |
|---|---|---|---|
| model T2 Result of old model T3 | 0.37 | 0.40 | 0.23 |
| Average | 0.45 | 0.35 | 0.20 |

Referring to FIG. 1 again, step S02 is to create an error record R, wherein the error record R includes at least one wrong component type previously determined incorrectly by the model and at least one wrong installation site corresponding to the wrong component type. Specifically, the error record R is a record of component types and installation sites of the component images, which are determined abnormally by the model in the past. For example, in this embodiment, the component images include four component types: capacitor, USB (universal serial bus), resistor, and power supply. The numbers of installation site(s) corresponding to the component types, respectively, are 1, 4, 2 and 1. In this case, about 50% of the installation sites that are determined incorrectly in the past are the second and third installation sites of USB, and about 50% thereof are the first installation site of resistors. Therefore, the error record R may include the component type of USB and the corresponding second and third installation sites, and the component type of resistor and the corresponding first installation site. To be noted, the sequence of the step S01 and the step S02 can be changed and is not limited in this embodiment.

The step S03 is to execute an image selection assignment to create a data set DS. The details of the step S03 will be further described with reference to FIG. 2. In this case, the image selection assignment is executed with utilizing the "data intelligent assignment module 2" of FIG. 3 to obtain the data set DS.

First, the step S031 is obtaining a total number of images used for training the model by performing an operation with an optimization algorithm based on the model and a training system 4 for training the model (stored in the system record bank SB). In this embodiment, the total number of images used for training the model is calculated based on the model information and the configuration information of the training system 4, so that when the training system 4 uses multiple component images whose number is the total number of images to train the model, the idle resources of the training system 4 can be minimized. In other words, the present disclosure can make full use of the system resources of the training system 4 for model training, so that the idle system resources can be minimized.

In addition, the total number of images is greater than or equal to the total number of the installation sites corresponding to each of the component types. For example, in this embodiment, the component types include the above-mentioned four component types of capacitor, USB, resistor, and power supply, and the number of installation sites corresponding to capacitor, USB, resistor, and power supply are 1, 4, 2 and 1, respectively. Therefore, the total number of installation sites is 1+4+2+1=8, so the total number of images must be greater than or equal to 8. The above concept of "the total number of images is greater than or equal to the total number of the installation sites corresponding to each of the component types" means: each installation site of each component type must have at least one component image to ensure that the selected component images can achieve data balance. In this embodiment, the total number of images calculated according to the configuration information of the training system 4 is, for example, 400.

The step S032 is, based on the total number of images, a total number of the component types and a total number of the installation sites corresponding to the component types, to obtain a plurality of average site image numbers respectively corresponding to the component types. In this case, this step is to divide the total number of images by the total number of component types to obtain an average type image number, and to divide the average type image number by the total numbers of the installation sites corresponding to the component types respectively to obtain the average site image numbers corresponding to each component type. Herein, the average type image number is the number of images that should be assigned to each component type. In this embodiment, the average type image number is 400/4=100, and the total numbers of installation sites corresponding to the component types of capacitor, USB, resistor, and power supply are 1, 4, 2 and 1 respectively. Thus, the average site image number of the first component type (capacitor) is 100/1=100, the average site image number of the second component type (USB) is 100/4=25 (still 100 images in total), the average site image number of the third component type (resistor) is 100/2=50 (still 100 images in total), and the average site image number of the fourth component type (power supply) is 100/1=100.

The step S033 is, based on a total weight value, a total number of the wrong component type and a total number of the wrong installation site corresponding to the wrong component type, to obtain at least one wrong site weight value corresponding to the wrong installation site. In this case, this step is to divide the total weight value by the total number of the wrong component types to obtain a wrong type weight value, and to divide the wrong type weight value by the total number of the wrong installation sites corresponding to each of the wrong component types to obtain the wrong site weight value. In one embodiment, the total weight value may be, for example, greater than or equal to 15%, and less than or equal to 25% depending on requirements. The total weight value in this embodiment is, for example, 20%. As shown in Table 2 and Table 3, the total number of the wrong component types is 2 (USB and resistor). Therefore, the weight value of the wrong component types is 20%/2=10%. Since the component type of USB has 2 wrong installation sites (the second and third installation sites), the wrong site weight value of the second and third installation sites of USB is 10%/2=5%. In addition, since the component type of resistor has 1 wrong installation site (first installation site), the wrong site weight value of the first installation site of resistor is 10%/1=10%.

The step S034 is obtaining a plurality of weights corresponding to the installation sites in the wrong component type, based on the wrong site weight value, and to perform a weight calculation with the weights and the corresponding average site image numbers to obtain a plurality of site image numbers corresponding to the installation sites in the wrong component type respectively. In the step of obtaining the weights corresponding to the installation sites in the wrong component type respectively includes: increasing the weight of the wrong installation site with the wrong site weight value, and reducing a weight of at least one correct installation site with a correct site weight value. Herein, a sum of all the wrong site weight values is equal to a sum of all the correct site weight values. In other words, this step is to increase the weight of the installation sites that are determined incorrectly, and at the same time reduce the weight of the installation sites that are determined correctly, while the sum of the increased weights of all installation sites that are determined incorrectly is equal to the sum of the reduced weights of all installation sites that are determined correctly (total weight increased equals total weight reduced). When increasing the weight of the installation sites that are determined incorrectly in each wrong component type, the weight of the installation sites that are determined incorrectly can be increased by the wrong site weight value (e.g. USB is 5% and resistor is 10%).

As shown in Table 2, the wrong site weight value of each wrong installation site (the second and third installation sites) of USB is 5%, and the correct site weight value of each correct installation site (the first and fourth installation sites) of USB is 5%. That is, the weight values of the first installation site and the fourth installation site are both reduced by 5% (the weight values of the wrong installation sites are totally increased by 10%, and the weight values of the correct installation sites are totally reduced by 10%). In addition, as shown in Table 3, since the wrong site weight value of the wrong installation site (the first installation site) of resistor is 10%, the correct site weight value of the correct installation site (the second installation site) of resistor is 10%, which means that the weight value of the second installation site is reduced by 10% (the weight value of the wrong installation site is increased by 10%, and the weight value of the correct installation site is reduced by 10%). Therefore, as shown in Table 4, the weight values corresponding to the installation sites of USB are 0.95, 1.05, 1.05 and 0.95 respectively, and the weight values corresponding to the installation sites of resistor are 1.1 and 0.9 respectively. The site image numbers for the installation sites of USB are respectively 24, 26, 26 and 24 (the sum of total image numbers is still 100; if not divisible, it is rounded up), and the site image numbers for the installation sites of resistor are respectively 55 and 45 (the sum of total image numbers is still 100; if not divisible, it is rounded up).

TABLE 2 example of installation sites of USB
and corresponding weight values

| Component type | Site | Weight value |
| --- | --- | --- |
| USB | 1 | 1 − 5% = 0.95 |
|  | 2 | 1 + 5% = 1.05 |
|  | 3 | 1 + 5% = 1.05 |
|  | 4 | 1 − 5% = 0.95 |

TABLE 3 example of installation sites of resistor
and corresponding weight values

| Component type | Site | Weight value |
| --- | --- | --- |
| resistor | 1 | 1 + 10% = 1.1 |
|  | 2 | 1 − 10% = 0.9 |

TABLE 4 example of assignment result of data intelligent assignment module

| Component type | Site | Total image number | Weight value | Site image number |
| --- | --- | --- | --- | --- |
| Capacitor | 1 | 100 | 1 | 100 |
| USB | 1 | 100 | 0.95 | 100/4*0.95 = 24 |
|  | 2 |  | 1.05 | 100/4*1.05 = 26 |
|  | 3 |  | 1.05 | 100/4*1.05 = 26 |
|  | 4 |  | 0.95 | 100/4*0.95 = 24 |
| Resistor | 1 | 100 | 1.1 | 100/2*1.1 = 55 |
|  | 2 |  | 0.9 | 100/2*0.9 = 45 |
| Power supply | 1 | 100 | 1 | 100 |

The step S035 is, selecting the component images labeled as the wrong component type and the installation sites in the wrong component type from the image labeling library PB according to the site image numbers, and to add the selected component images to the data set DS. In other words, referring to Table 4, the image numbers of the component images corresponding to the installation sites of USB selected from the image labeling library PB are 24, 26, 26 and 24, and then the selected component images (100 component images in total) are added to the data set DS. Afterwards, the image numbers of the component images corresponding to the installation sites of resistor selected from the image labeling library PB are 55 and 45, and then the selected component images (100 component images in total) are also added to the data set DS.

In addition, the step S03 of executing the image selection assignment can further include: selecting the component images of the installation sites labeled as correct component types, which are determined correctly by the model, from the image labeling library PB, according to the average site image numbers, and adding the selected component images to the data set DS. In this embodiment, as shown in Table 4, the correct component types determined correctly by the model are capacitor and power supply, so it is needed to select 100 component images of capacitor and 100 component images of power supply from the image labeling library PB, and add them to the data set DS. Therefore, the data set DS includes 400 component images in total. In addition, the image selection method can further include: adding the component images of the image labeling library PB without being selected into the data set DS to a candidate data set CS (see FIG. 4). To be noted, the candidate data set CS also includes the component images with confirmed mark and the component images with unconfirmed mark.

Since the aforementioned data set DS contains "the component images with unconfirmed mark", the labels of some component images may be incorrect, so it is necessary to check before training the model. In the process of checking the data set DS, the present disclosure can feed back the checking results in real time to correct the data set DS, so that a correcting module 3 (see FIG. 3) can correct and update the unchecked data according to the feedback information. That is, the component images unchecked in the data set DS can be updated in real time, thereby saving correction time and re-searching time for data. Herein, the correcting module 3 includes a neural network without classification layer, which is obtained by retrieving a neural network from the model and removing a classification layer in the neural network.

With reference to FIGS. 1, 3 and 4, after the step of executing the image selection assignment to create the data set DS, the image selection method further includes a step S04 of: calibrating the data set DS to generate a calibrated data set MS. In this case, the step of calibrating the data set DS includes: determining whether the data set DS includes unchecked component image or not; if not, the calibration is ended; and if yes, selecting one of the unchecked component images from the data set DS for checking, so as to confirm the selected component image is a component image with the confirmed mark or a component image with the unconfirmed mark. If the selected component image is a component image with the confirmed mark, the selected component image is added to the calibrated data set MS. If the selected component image is a component image with the unconfirmed mark, this method includes the step of determining whether the label of the component image with the unconfirmed mark is incorrect or not; and if yes, correcting the label of the selected component image with the unconfirmed mark and adding it to the calibrated data set MS. Herein, if the label information of the component image is incorrect and is then corrected, the corrected component image will have a probability of 100% to be fed back to the correcting module 3 to update the parameters of the correcting module 3 (e.g. updating the parameters of the neural network without classification layer of the correcting module 3). If the label of the component image with the unconfirmed mark is correct, which means that it is unnecessary to correct the label of this component image, the selected component image with the unconfirmed mark is directly added to the calibrated data set MS, and a random number generator is used to generate a random number between 0 and 1, and determine whether the random number is less than a specified probability or not. If yes, the component image is fed back to the correcting module 3 for updating the parameters of the correcting module 3. If not, the component image is not fed back to the correcting module 3. For example, if the generated random number is 0.03 and the specified probability is 0.05, since 0.03 is less than 0.05, the component image is fed back to the correcting module 3 for updating the parameters of the correcting module 3.

Afterwards, the correcting module 3 can update the component images unchecked in the data set DS based on the component images unchecked in the data set DS and the candidate data set CS. In this case, the step of updating the component images unchecked in the data set DS can include: selecting a specified component type and a specified installation site, and selecting one of the component images from the calibrated data set MS as a sample. In this step, the component type and installation site labeled in the sample must be the specified component type and the specified installation site. If the calibrated data set MS does not contain the component images labeled with the specified component type and the specified installation site, one component image, which is labeled with the specified component type and the specified installation site, is selected from the component images with confirmed mark is selected as the sample. Then, the component images unchecked in the data set DS and the component images in the candidate data set CS are respectively inputted into a neural network without classification layer to obtain a plurality of feature representation vectors. Afterwards, the sample is inputted into the neural network without classification layer to obtain a sample feature vector, and a similarity calculation between each of the feature representation vectors and the sample feature vector is performed to obtain a plurality of similarity values corresponding to the sample for the component images unchecked in the data set DS and the component images in the candidate data set CS. Finally, in order to preserve the diversity of the component images of the component type, the component images unchecked in the data set DS and the component images in the candidate data set CS are sorted according to the similarity values (sorting from the highest similarity value to lowest similarity value), and then the (S*N) component images with the top (S*N) similarity values are extracted. Wherein, N is a number of the component images in the data set DS that have not been checked and corresponded to the sample, and S is a positive integer greater than 1. In this embodiment, S is, for example, 3. After that, N component images are randomly sampled from the extracted (S*N) component images with the top (S*N) similarity values, and the sampled N component images are used to update the component images unchecked corresponding to the sample in the data set DS. In this case, "the component image corresponding to the sample" refers to the component image with the labeled component type and installation site that are the same as those of the sample.

The similarity equation can be as follow, wherein A is the sample feature vector of the sample, and B is the feature representation vector of the component image unchecked in the data set DS or the feature representation vector of the component image in the candidate data set CS.

$$\text{similarity} = \cos(\theta) = \frac{A \cdot B}{\|A\|\|B\|} = \frac{\sum_{i=1}^{n} A_i B_i}{\sqrt{\sum_{i=1}^{n} A_i^2} \sqrt{\sum_{i=1}^{n} B_i^2}}$$

In this embodiment, the above steps need to be carried out one by one, according to the combinations of each component type and the corresponding installation sites, to obtain the number of unchecked component images of each component type, so as to update all the component images unchecked in the data set DS (please refer to Table 5). After updating all the component images unchecked in the data set DS, the component images unchecked in the updated data set DS are then checked one by one until all the component images in the data set DS are checked.

TABLE 5 example of the number of component image needed to be re-assigned after checking

| Component type | Site | Required number generated by the data intelligent assignment module | Checked component image | Unchecked component image |
|---|---|---|---|---|
| Capacitor | 1 | 100 | 100 | 0 |
| USB | 1 | 24 | 21 | 3 |
|  | 2 | 26 | 10 | 16 |
|  | 3 | 26 | 11 | 15 |
|  | 4 | 24 | 24 | 0 |
| Resistor | 1 | 45 | 20 | 25 |
|  | 2 | 55 | 10 | 45 |
| Power supply | 1 | 100 | 82 | 18 |

From the above content, it can be understood that the present disclosure can create the required data set DS in real time, reduce the time for manual selection and labeling of data, and calibrate the unchecked data in the data set DS in real time, when checking out the label error, by correcting and feeding back to the correcting module 3.

In summary, the image selection method of this disclosure, which is applied to retrain a model, includes the steps of establishing an image labeling library, creating an error record, obtaining a total number of images used for training the model by performing an operation with an optimization algorithm, and automatically executing an image selection assignment of component images corresponding to the component types and installation sites, respectively, according to the error record so as to establish a data set. Based on these steps, the image selection method of this disclosure can efficiently collect and create the required data set used for training the model in real time, reduce the time for manual selection and labeling of data, and calibrate the unchecked data in the data set DS in real time, when checking out the label error, by correcting and feeding back to the correcting module. Accordingly, the image selection method of this disclosure can shorten the time spent on manual processing and model re-deployment, and reduce the loss of production capacity.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. An image selection method applied to retrain a model, wherein the model is suitable for determining component types of a plurality of component images, and each of the component types corresponds to at least one of a plurality of installation sites, the image selection method at least comprising steps of:
    establishing an image labeling library, wherein the image labeling library includes the plurality of component images, and each of the component images is correspondingly labeled with one of the component types and one of the installation sites;
    creating an error record, wherein the error record includes at least one wrong component type previously determined incorrectly by the model and at least one wrong installation site corresponding to the wrong component type; and
    executing an image selection assignment to create a data set, wherein the image selection assignment comprises:
        obtaining a total number of images used for training the model by performing an operation with an optimization algorithm based on the model and a training system for training the model;
        based on the total number of images, a total number of the component types and a total number of the installation sites corresponding to the component types, obtaining a plurality of average site image numbers corresponding to the component types;
        based on a total weight value, a total number of the wrong component type and a total number of the wrong installation site corresponding to the wrong component type, obtaining at least one wrong site weight value corresponding to the wrong installation site;
        obtaining a plurality of weights corresponding to the installation sites in the wrong component type based on the wrong site weight value, and performing a weight calculation with the weights and the corresponding average site image numbers to obtain a plurality of site image numbers corresponding to the installation sites in the wrong component type respectively; and
        selecting the component images labeled as the wrong component type and the installation sites in the wrong component type from the image labeling library according to the site image numbers, and adding the selected component images to the data set.

2. The image selection method of claim 1, wherein the total number of images is greater than or equal to the total number of the installation sites corresponding to the component types.

3. The image selection method of claim 1, wherein the step of obtaining the average site image numbers comprises:
    dividing the total number of images by the total number of the component types to obtain an average type image number; and
    dividing the average type image number by the total numbers of the installation sites corresponding to the component types respectively to obtain the average site image numbers.

4. The image selection method of claim 1, wherein the step of obtaining the wrong site weight value comprises:
    dividing the total weight value by the total number of the wrong component type to obtain a wrong type weight value; and
    dividing the wrong type weight value by the total number of the wrong installation site corresponding to the wrong component type to obtain the wrong site weight value.

5. The image selection method of claim 1, wherein the total weight value is greater than or equal to 15% and is less than or equal to 25%.

6. The image selection method of claim 1, wherein the step of obtaining the weights corresponding to the installation sites in the wrong component type comprises:
    increasing the weight of the wrong installation site with the wrong site weight value, and reducing a weight of at least one correct installation site with a correct site weight value, wherein a sum of the wrong site weight value is equal to a sum of the correct site weight value.

7. The image selection method of claim 1, wherein the image selection assignment further comprises:
    selecting the component images of the installation sites labeled as correct component types determined correctly by the model, from the image labeling library, according to the average site image numbers; and
    adding the selected component images to the data set.

8. The image selection method of claim 1, wherein the component images of the image labeling library comprise at least one component image with a confirmed mark and at least one component image with an unconfirmed mark.

9. The image selection method of claim 8, wherein the step of establishing the image labeling library comprises:
    determining the component types of the component image with the unconfirmed mark by using multiple old models previously trained; and
    updating a component type label of the component image with the unconfirmed mark according to an average result generated by the old models.

10. The image selection method of claim 8, after the step of executing the image selection assignment to create the data set, further comprising:
    calibrating the data set, which comprises:
        selecting one of the component images from the data set, and checking whether the component image is the component image with the confirmed mark or the component image with the unconfirmed mark;

if the component image is the component image with the unconfirmed mark, determining whether a label of the component image with the unconfirmed mark is correct or not; and if the label of the component image with the unconfirmed mark is not correct, correcting the label of the selected component image with the unconfirmed mark and adding it to a calibrated data set; if the label of the component image with the unconfirmed mark is correct, adding the selected component image with the unconfirmed mark to the calibrated data set.

11. The image selection method of claim 10, wherein the step of calibrating the data set further comprises:

if the selected component image is the component image with the confirmed mark, adding the selected component image with the confirmed mark into the calibrated data set.

12. The image selection method of claim 10, wherein the step of calibrating the data set further comprises:

adding the component images of the image labeling library, without being selected and added into the data set, to a candidate data set;

selecting one of the component images from the calibrated data set as a sample;

inputting the component images unchecked in the data set and the component images in the candidate data set into a neural network without a classification layer to obtain a plurality of feature representation vectors;

inputting the sample into the neural network without the classification layer to obtain a sample feature vector;

performing a similarity calculation between each of the feature representation vectors and the sample feature vector to obtain a plurality of similarity values corresponding to the sample for the component images unchecked in the data set and the component images in the candidate data set;

sorting the component images from highest to lowest of the similarity values, and extracting (S*N) component images with the top (S*N) similarity values, wherein N is a number of the component images in the data set that have not been checked and corresponded to the sample, and S is a positive integer greater than 1; and randomly sampling N component images from the extracted (S*N) component images with the top (S*N) similarity values, and updating the component images unchecked corresponding to the sample in the data set with the sampled N component images.

* * * * *